United States Patent
Ramesh et al.

(10) Patent No.: US 7,647,280 B1
(45) Date of Patent: Jan. 12, 2010

(54) CLOSED-LOOP ESTIMATION OF REQUEST COSTS

(75) Inventors: Bhashyam Ramesh, San Diego, CA (US); Douglas P. Brown, Rancho Santa Fe, CA (US)

(73) Assignee: Teradata US, Inc., Miamisburg, OH (US)

( * ) Notice: Subject to any disclaimer, the term of this patent is extended or adjusted under 35 U.S.C. 154(b) by 821 days.

(21) Appl. No.: 10/730,629

(22) Filed: Dec. 8, 2003

(51) Int. Cl.
*G06Q 99/00* (2006.01)

(52) U.S. Cl. .............................. 705/400; 705/1; 707/2

(58) Field of Classification Search ................ 705/40, 705/1, 400; 707/2–3, 101
See application file for complete search history.

(56) References Cited

U.S. PATENT DOCUMENTS

| | | | | |
|---|---|---|---|---|
| 4,956,774 | A * | 9/1990 | Shibamiya et al. | 707/2 |
| 5,899,986 | A * | 5/1999 | Ziauddin | 707/2 |
| 6,003,022 | A * | 12/1999 | Eberhard et al. | 707/2 |
| 6,026,391 | A * | 2/2000 | Osborn et al. | 707/2 |
| 6,182,079 | B1 * | 1/2001 | Lenzie | 707/101 |
| 6,349,305 | B1 * | 2/2002 | Hara et al. | 707/102 |
| 6,957,211 | B1 * | 10/2005 | Tyulenev et al. | 707/2 |
| 2003/0236745 | A1 * | 12/2003 | Hartsell et al. | 705/40 |
| 2004/0093332 | A1 * | 5/2004 | Hrle | 707/3 |

OTHER PUBLICATIONS

Selinger et al. , "Access Path Selection in a Relational Database Management System", May 30-Jun. 1, 1979, Boston, Massachusetts; Proceedings of the 1979 ACM SIGMOD International Conference on Management of Data, pp. 23-34.*
Rennhackkamp, Martin, "Performance Tuning"; Oct.1996; DBMS , v9 , n11, p85 (9 pgs).*

* cited by examiner

*Primary Examiner*—John W Hayes
*Assistant Examiner*—Freda A Nelson
(74) *Attorney, Agent, or Firm*—Howard Speight

(57) ABSTRACT

Request processing is optimized. The request has elements. The method, computer program and database system includes selecting an access path for the request taking into consideration a stored actual request element cost, processing the request using the selected access path, producing one or more actual request element costs, and storing the one or more actual request element costs.

52 Claims, 7 Drawing Sheets

CLOSED-LOOP ESTIMATION OF REQUEST COSTS

BACKGROUND

A database management system is accessed and managed through "requests." A request can be a query, through which the database is accessed, or an instruction to execute a utility, such as a load command. Most database management systems use an optimizer to select an access plan, or query execution plan, for a database request and most optimizers rely on a cost model, where cost is associated with the amount of a resource, such as CPU or I/O, that must be devoted to a task, to choose the best access plan to execute any given request. Most cost models rely on a mathematical construct that uses estimates of the numbers of rows (cardinalities) which will result at each step of the access plan. The estimates are often based on assumptions regarding the contents of the database tables.

SUMMARY

In general, in one aspect, the invention features a method for optimizing processing of a request. The request has elements. The method includes selecting an access path for the request taking into consideration a stored actual request element cost, processing the request using the selected access path, producing one or more actual request element costs, and storing the one or more actual request element costs.

Implementations of the invention may include one or more of the following. The request may include one or more predicates. Each predicate may reference one or more relations. Selecting an access path may include identifying the relations in the request, identifying one or more access paths for each relation, and extracting the predicates from the request. For each predicate the method may include associating the predicate with the one or more access plans identified for the one or more relations referenced in the predicate and estimating the cost of one or more access paths associated with the predicate. For each access path the method may include selecting the cheaper of the estimated access path cost and an actual access path cost, if one exists. Estimating the cost of one or more access paths may include retrieving estimated costs stored in a data dictionary. Estimating the cost of one or more access paths may include performing selectivity costing based on one or more of selectivity, cardinality and statistics. Selecting an access path may further includes for each predicate, selecting the lowest cost access path from among the access paths associated with each predicate.

Requests may be sorted into workload groups. The method may include categorizing the actual request element costs according to the workload group to which the request belongs. Selecting an access path for the request taking into consideration a stored actual request element cost may include taking into consideration the categorized actual request element cost, if it exists, for the workload group to which the request belongs. Storing the one or more actual request element costs may include storing the one or more actual request element costs in a cache. Storing the one or more actual request element costs may include backing up the stored one or more actual request element costs from the cache to a query capture data base. The method may further include assigning the request to an one of a plurality of workload groups. Selecting an access path for the request may include taking into consideration a stored actual request element cost if the one of the plurality of workload groups is identified for such processing. Selecting an access path for the request may not include taking into consideration a stored actual request element cost if the one of the plurality of workload groups is not identified for such processing. Storing the one or more actual request element costs may include performing a workload analysis to associate each actual request element cost with the workload group to which the request is assigned. Performing the workload analysis may include performing at least a portion of the workload analysis off-line. Performing the workload analysis may include performing at least a portion of the workload analysis in real time. The method may further include creating one or more workload groups and assigning the request to one of the one or more workload groups.

In general, in another aspect, the invention features a method for optimizing processing of a workload group. The workload group includes one or more requests. Each request has elements. The method includes selecting an access path for a request taking into consideration a stored actual request element cost, categorized by workload group. The method further includes processing the request using the selected access path, producing one or more actual request element costs, and storing the one or more actual request element costs, categorized by workload group.

In general, in another aspect, the invention features a computer program, stored on a tangible storage medium, for use in optimizing processing of a request, the request having elements. The program includes executable instructions that cause a computer to select an access path for the request taking into consideration a stored actual request element cost, process the request using the selected access path, producing one or more actual request element costs, and store the one or more actual request element costs.

In general, in another aspect, the invention features a database system including a massively parallel processing system, which includes one or more nodes, a plurality of CPUs, each of the one or more nodes providing access to one or more CPUs, a plurality of data storage facilities each of the one or more CPUs providing access to one or more data storage facilities, and a process for execution on the massively parallel processing system for optimizing processing of a request. The request has elements. The process includes selecting an access path for the request taking into consideration a stored actual request element cost, processing the request using the selected access path, producing one or more actual request element costs, and storing the one or more actual request element costs.

Implementations of the invention may include one or more of the following. The database system may include a plurality of additional process for optimizing processing of a request.

DETAILED DESCRIPTION

Figure 1:
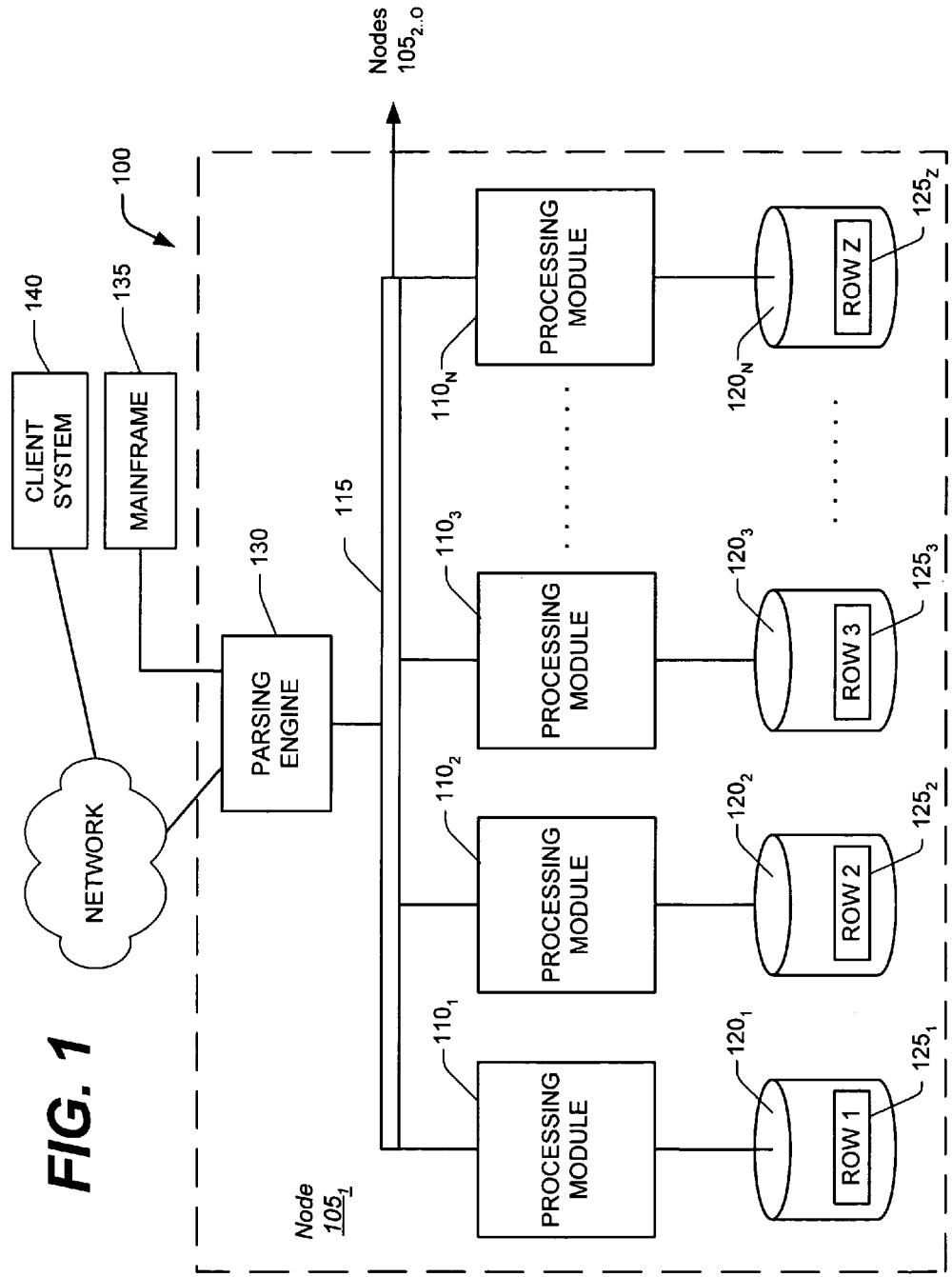
FIG. 1 is a block diagram of a node of a database system.

The closed-loop technique for estimating the cost to execute requests disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
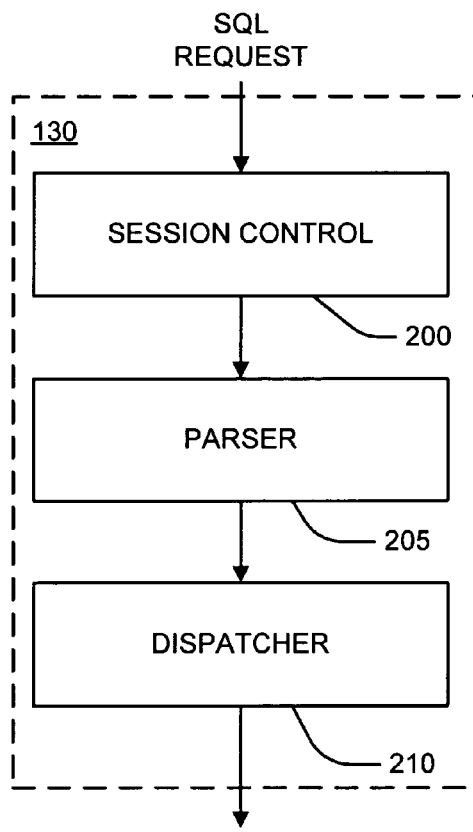
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
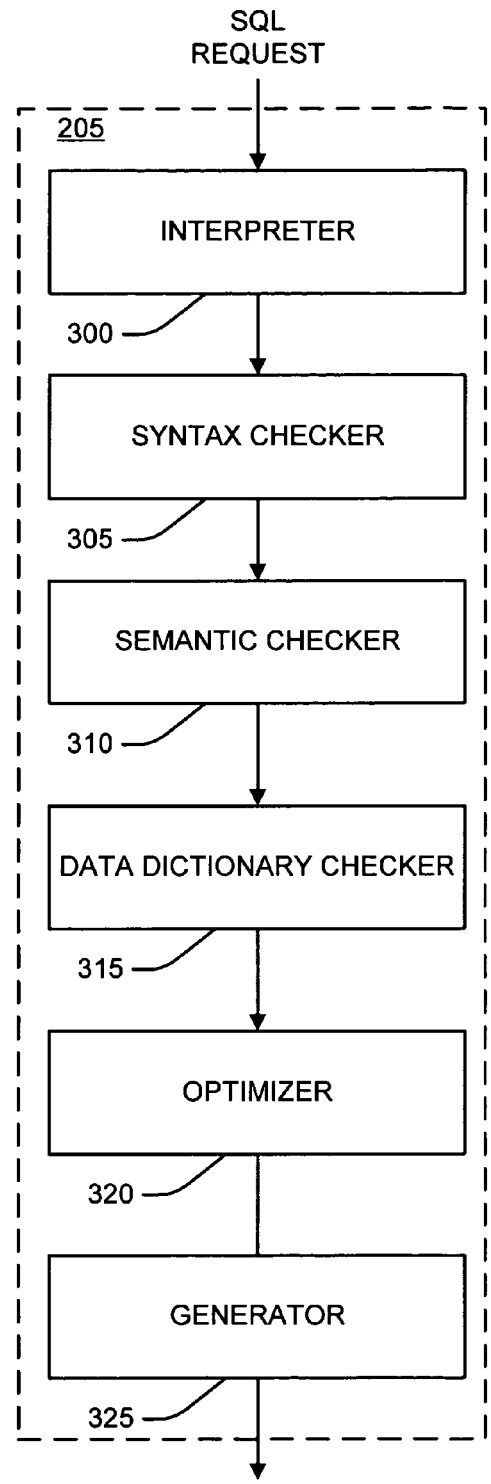
FIG. 3 is a block diagram of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). The parser 205 runs an optimizer (block 320), which develops the least expensive plan to perform the request. Finally, a generator (block 325) generates the steps to be executed.

Figure 4:
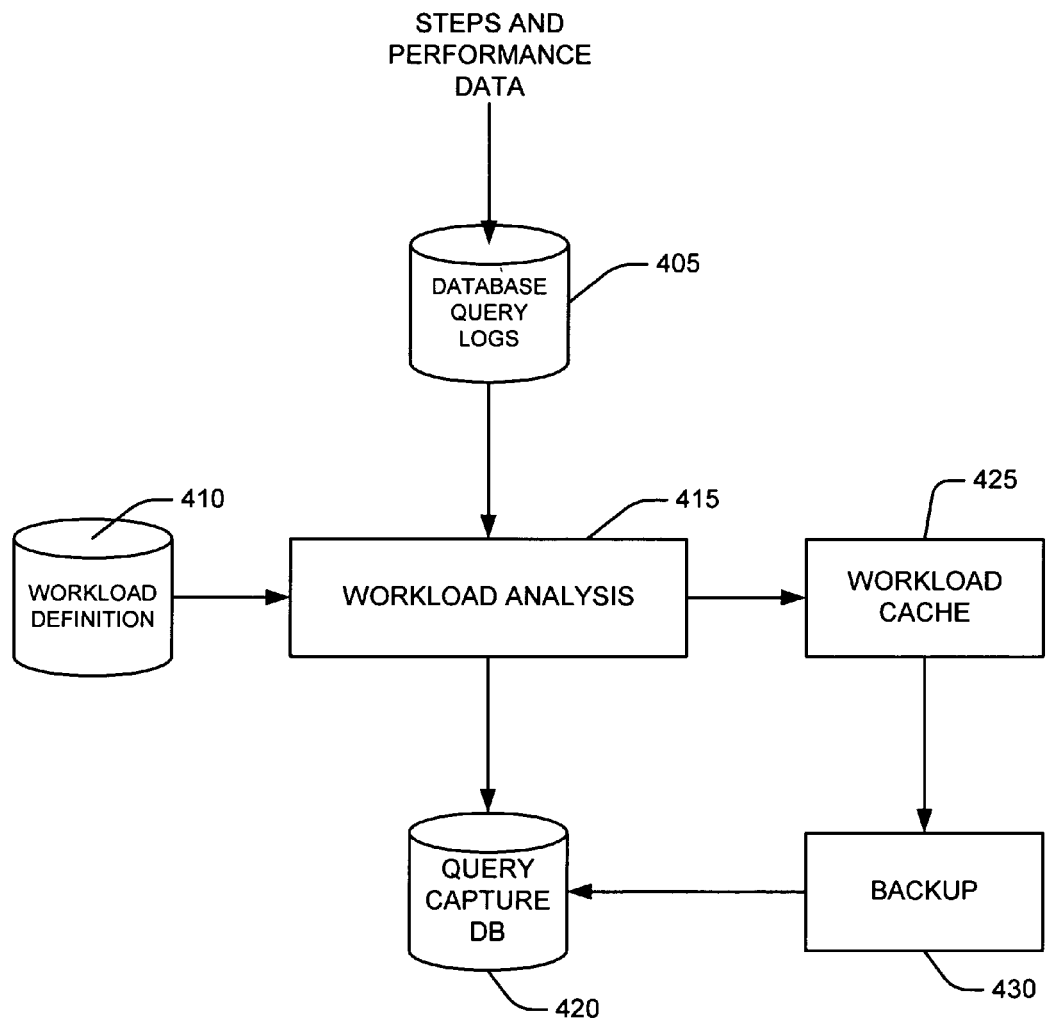
FIG. 4 is a block diagram of a system to capture information regarding request processing.

As illustrated in FIG. 4, the steps generated for queries and other requests, and statistics regarding system performance for those steps, are stored in one or more database query logs 405. The system may include a single database query log 405 or it may include multiple database query logs. For example, each user may be assigned his/her own database query log. Similarly, each workload group (defined below) may be assigned its own database query log. Further, even if the database query log is a single log, it may be organized by user or by workload groups.

Queries and other requests are sorted into sets (i.e., classes of queries) known as "workload groups" having, for example, similar performance expectations. For example, the system may define service level goals (SLGs) for each workload group which are used to monitor and adjust the performance of the system, as described in co-pending U.S. patent application Ser. No. 10/730,348, entitled Administering the Workload of a Database System Using Feedback, by Douglas P. Brown, Anita Richards, Bhashyam Ramesh, Caroline M. Ballinger, and Richard D. Glick, filed on Dec. 8, 2003, incorporated by reference. The service level goals, the association of requests with workloads, and other workload information, are stored in a workload definition database 410.

A workload analysis process 415 retrieves performance information from the database query logs 405 and stores it in a query capture database (QCD) 420. Alternatively, the system stores the performance information in a workload cache 425. In one example system, the cache is sorted by workload groups, which means that performance information can be accessed quickly if an identifier for the workload group is known. The workload analysis process 415 may be a manual process or it may be automatic. The process may be performed off-line, e.g., at night, or it may be performed in real time.

The information from the workload cache 425 is backed up (block 430) to the QCD periodically or when the cache is full or when another condition related to the process about to be described occurs. The result is that the QCD 420 contains actual cost information for query steps that have been executed by the system. This workload analysis may be performed for all workload groups or for only selected workload groups.

Included in the actual cost information stored in the QCD is the cost of processing identified predicates using identified access paths to access relations referenced in a requests (e.g., a tables). An example of a predicate is found in the WHERE clause of a SQL statement. For example, in the SQL statement:

SELECT*WHERE table1.name='joe';

the single predicate is "table1.name='joe'". In this example, the relation referenced in the predicate is "table1". A request may have multiple predicates and the predicates themselves can take a variety of forms, as is known in the art.

An access path to a relation is a method for retrieving information from the relation. Each relation may have several access paths. For example, a particular relation may have the following access paths:

all_access_ok: a relation with this access path can be scanned using any of the access paths defined on the table, including those listed below.

nu2nd_access_ok: a relation with this access path can only be scanned using a non-unique secondary index.

pk_access_ok: a relation with this access path can only be scanned using a unique primary index.

seq_access_ok: a relation with this access path can only be scanned sequentially.

When planning access to a single relation as part of an overall plan for processing a request, the optimizer 320 costs all of the available access plans and identifies the index ID of the cheapest access path.

A predicate that references a relation may be executed using any of the access paths for that relation. The database query logs store actual performance statistics (also called "actual costs") for predicates that have been executed using the different access paths for the relations referenced in the predicates. Herein, costs refer to the resources that a request consumes. For example, a request may cost 100 CPU-seconds, 100 input/outputs, and 2 hours of actual time.

Figure 5:
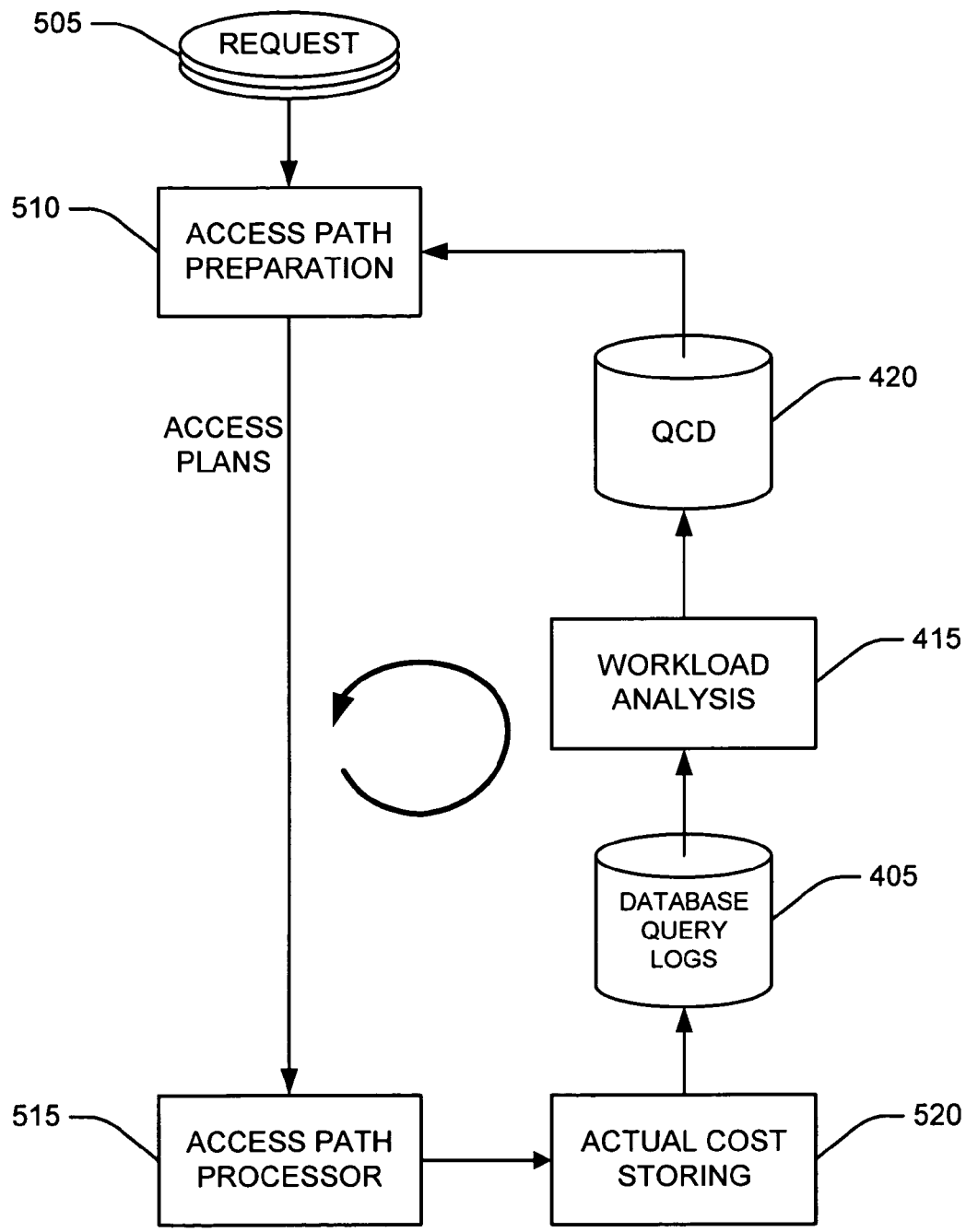
FIGS. 5-8 are flow charts for closed-loop processes to estimate the cost of executing requests.

As illustrated in FIG. 5, the system uses the actual costs stored in the QCD 420 to improve the operation of the optimizer 320. As shown in FIG. 5, a request or requests is presented to an access preparation block 510, which identifies all of the predicates and associated access paths for each of the requests to be executed, along with the cost associated with the predicates and associated access paths. In making these identifications, for at least some workgroups, the access preparation block 510 takes into account the actual cost information stored in the QCD 420.

The set of predicates and associated access plans is presented to an access plan processor (block 515) which uses predetermined criteria (such as total cost) to select an access plan for each predicate from among the available access plans for each predicate. The access path processor 515 then executes the predicates using the selected access plans and collects actual cost information as each of the predicates is executed. The actual cost information is stored (block 520) in the database query logs 405. The actual cost information is analyzed (block 420) and stored in the QCD 420 or in the workload cache 425 shown in FIG. 4, as discussed above. Thereafter, actual cost information is available for use in determining the cost of performing identified predicates using identified access plans. In one example system, the actual cost information is only available for workload groups for which such analysis has been selected and is not available for other workload groups.

As shown by the arrowed circle in FIG. 5, the access path processing forms a feedback loop. The actual cost of processing different access paths is used to adjust the estimates of the same cost made by the optimizer.

Figure 6:
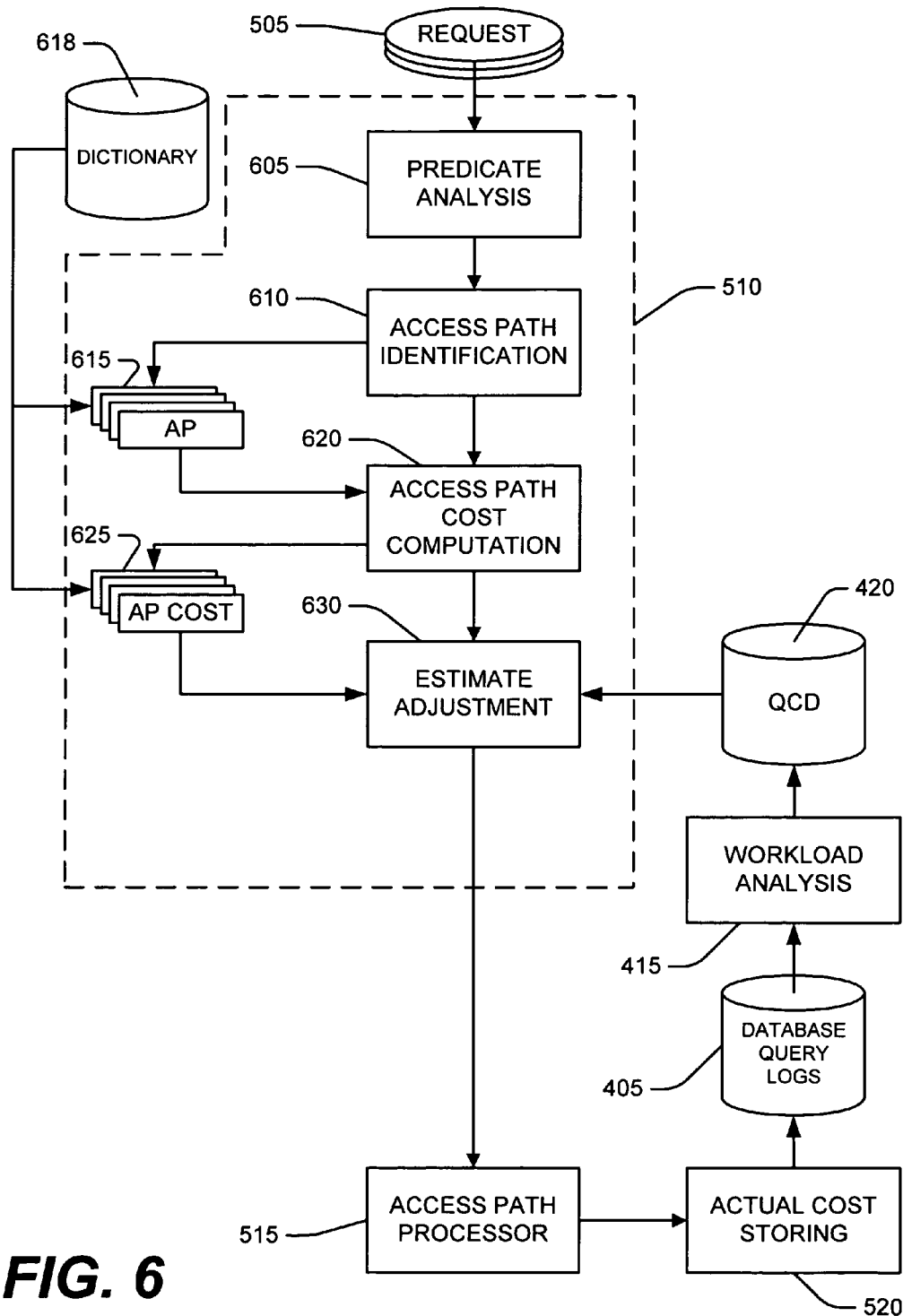

The access plan preparation block, shown in more detail within the dotted lines in FIG. 6, begins with predicate analysis (block 605). Predicates are sometimes called conditions, or in this application, request elements. In one example system, the predicate analysis process 510 generates an ANDED list of predicates that have been specified in, for example, the WHERE clause of a SQL SELECT statement. The ANDED predicate list may be pruned, for example, to exclude predicates for which a cost cannot be estimated. The predicate analysis process is similar to that described in as described in co-pending U.S. patent application Ser. No. 09/977,038, entitled "Index Selection in a Database System," by Douglas P. Brown, Jeetendra Chaware, and Manjula Koppuravuri, filed on Oct. 12, 2001, incorporated by reference.

The ANDED predicate list is used to build (block 610) a list of predicates and associated access paths 615. A list of access paths for each relation and other information useful for this analysis is stored in a dictionary 618. A cost estimate 625 is computed (block 620) for each access path for each of the predicates using information stored in the dictionary 618. The estimated cost is adjusted (block 630) using the actual cost information stored in the QCD (or in the workload cache 425), if the actual cost information exists. Processing then continues as described above with respect to FIG. 5.

The estimate adjustment process 630 may be invoked for all predicates and access paths associated with all received requests or it may be invoked more selectively. In one example system, the estimate adjustment process is only invoked for access paths associated with requests belonging to a selected workload group or groups. Access paths associated with requests belonging to non-selected workload groups would not have their estimated access path costs adjusted and would instead use the access path costs stored in location 625.

Figure 7:
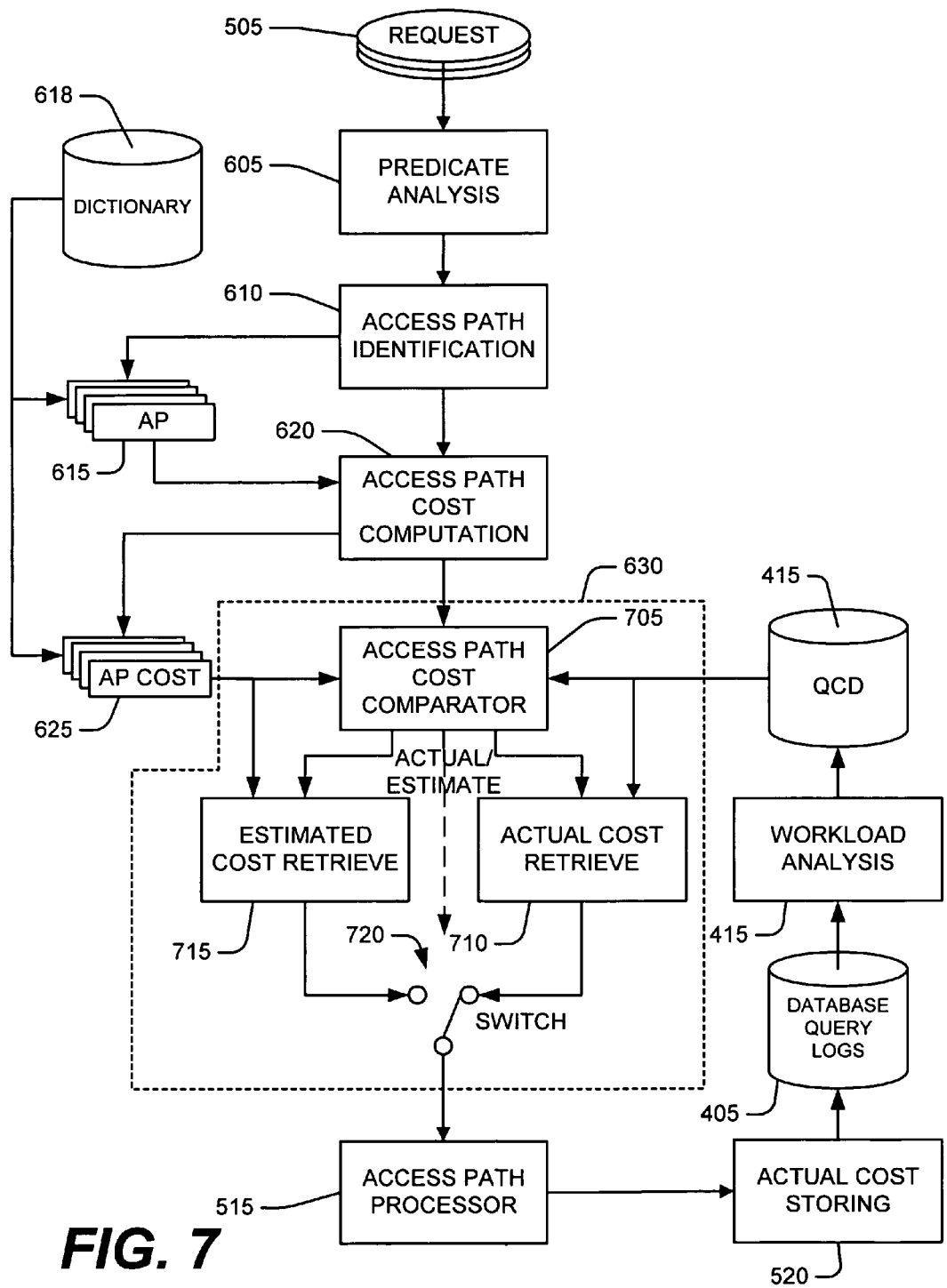

An example process for adjusting the cost estimates (block 620), illustrated in FIG. 7, compares the estimated access path costs 625 with the actual access path costs stored in the QCD 420 or workload cache 425, if they exist (block 705). In one example system, the access path cost comparator (block 705) determines if an actual path for a particular access path is stored in the QCD. If so, the system uses the actual cost rather than the estimated cost. As shown in FIG. 7, if an actual cost exists it is retrieved from the QCD (block 710). Otherwise, the estimated cost is retrieved (block 715) from the list of estimated costs. The selection between the estimated access cost and the actual access cost is represented by a switch 720, which is driven by a actual/estimated signal from the access path cost comparator (block 705). Otherwise, processing proceeds as described with respect to FIGS. 5 and 6. As mentioned above, the process shown within the dashed lines in FIG. 7 may be performed for all of the access plans or it may only be performed with respect to certain access plans associated with predicates that are part of requests assigned to selected workload groups.

In operation, a request (or several requests 505) are analyzed to identify their associated predicates (block 805). The predicates are analyzed, using information stored in the dictionary 618 to identify access paths for each predicate (block 810). The identified access paths and their associated predicates are stored in a list 615. A cost is estimated for each access path (block 815). The costs are stored in another list 625.

The estimated costs are then adjusted. For each access path, the system determines if the QCD 415 contains an actual cost (block 820). If so, the actual cost is used (block 825). Otherwise, the estimated cost is used (block 830). The system then moves to the next access path (block 835), returning to block 820. Once again, this process may be performed selectively, as described above.

Once the system has adjusted the cost for each of the access paths, it selects, using a predetermined criteria (such as lowest cost) a single access path for each predicate from among the access paths available for each predicate (block 840). It then processes and monitors the actual cost of each of the access paths (block 840). The system stores the actual costs in the database query logs 520 (block 845). Finally, the system analyzes the workloads 850 and stores the results in the QCD 415 (block 850).

Figure 8:
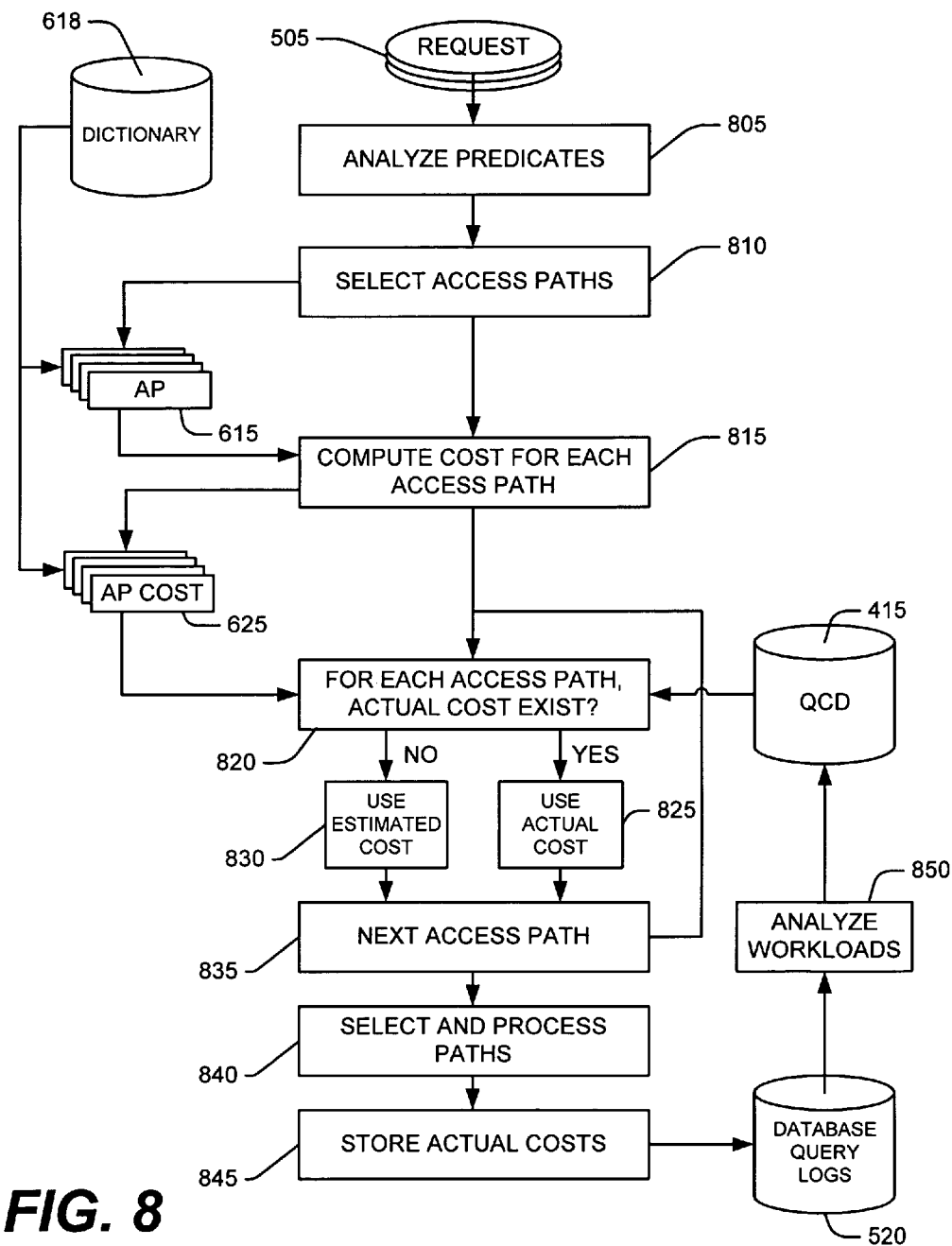

As can be seen in FIG. 8, the system has two loops, one nested inside the other. The first loop, including blocks 820, 825, 830 and 835, selects an actual cost or an estimated cost for each of the access paths. The second loop, which includes each of the elements of the first loop and elements 840, 845, 520, 850 and 415, determines an adjusted estimated cost for each of the access paths. The second loop provides feedback which has the capability of improving the performance of the optimizer 320.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for optimizing processing of a request, the request including one or more predicates, each predicate referencing one or more relations, the method including:

the computer-implemented steps of:

identifying the relations in the request; identifying one or more access paths for each relation;

identifying the predicates in the request; for each predicate, associating the predicate with the one or more access paths identified for the one or more relations referenced in the predicate;

estimating costs of executing the predicate using the one or more access paths associated with the predicate; and for at least one access path for which a cost was estimated, determining that a stored actual access path cost for the access path exists, and, in response, substituting the stored actual access path cost for the estimated access path cost, the stored actual access path cost for the access path being a measured cost of executing the predicate using the access path;

for each predicate, for each relation referenced in the predicate, selecting an access path from among the one or more access paths associated with the predicate;

executing the request using the selected access paths for the predicates, measuring an actual cost of executing the predicates in the request; and storing the measured actual costs as actual access path costs.

2. The method of claim 1 where estimating the cost of executing the predicates using the one or more access paths includes:

retrieving estimated costs stored in a data dictionary.

3. The method of claim 1 where estimating the cost of executing the predicates using the one or more access paths includes:

performing selectivity costing based on one or more of selectivity, cardinality and statistics.

4. The method of claim 1 where selecting an access path further includes:

for each predicate, selecting the lowest cost access path from among the access paths associated with each predicate.

5. The method of claim 1 where requests are sorted into workload groups and the method further includes:

categorizing the actual access path costs according to the workload group to which the request belongs.

6. The method of claim 5 where selecting an access path for the request taking into consideration a stored actual access path cost includes:

taking into consideration the categorized actual access path cost, if it exists, for the workload group to which the request belongs.

7. The method of claim 1 where storing the measured actual costs includes:

storing the measured actual costs in a cache.

8. The method of claim 7 where storing the measured costs includes:

backing up the stored measured actual one or more measured actual costs from the cache to a query capture data base.

9. The method of claim 1 further including:

assigning the request to an one of a plurality of workload groups; and where selecting an access path for the request includes taking into consideration a stored actual access path cost if the one of the plurality of workload groups is identified for such processing; and where selecting an access path for the request does not include taking into consideration a stored actual access path cost if the one of the plurality of workload groups is not identified for such processing.

10. The method of claim 9 where storing the one or more actual request element costs includes:

performing a workload analysis to associate each actual access path cost with the workload group to which the request is assigned.

11. The method of claim 10 where performing the workload analysis includes:

performing at least a portion of the workload analysis off-line.

12. The method of claim 10 where performing the workload analysis includes:

performing at least a portion of the workload analysis in real time.

13. The method of claim 1 further including:

creating one or more workload groups; and assigning the request to one of the one or more workload groups.

14. A method for optimizing processing of a workload group, the workload group including one or more requests, at least one of the requests including one or more predicates, each predicate referencing one or more relations the method including:

the computer-implemented steps of:

identifying the relations in the at least one request;

identifying one or more access paths for each relation;

identifying the predicates in the request;

for each predicate, associating the predicate with the one or more access paths identified for the one or more relations referenced in the predicate;

estimating costs of executing the predicate using the one or more access paths associated with the predicate; and for at least one access path for which a cost was estimated, determining that a stored actual access path cost for the access path exists, and, in response, substituting the stored actual access path cost for the estimated access path cost, the stored actual access path cost for the access path being a measured cost of executing the predicate using the access path;

for each predicate, for each relation referenced in the predicate, selecting an access path from among the one or more access paths associated with the predicate;

executing the request using the selected access paths for the predicates, measuring an actual cost of executing the predicates in the request; and storing the measured actual costs as actual access path costs, categorized by workload group.

15. The method of claim 14 where estimating the cost of executing the predicates using the one or more access paths includes.

16. The method of claim 14 where estimating the cost of executing the predicates using the one or more access paths includes:

performing selectivity costing based on one or more of selectivity, cardinality and statistics.

17. The method of claim 14 where selecting an access path further includes:

for each predicate,
  selecting the lowest cost access path from among the access paths associated with each predicate.

18. The method of claim 14 where the method further includes:

categorizing the actual access path costs according to the workload group to which the request belongs.

19. The method of claim 18 where selecting an access path for the request taking into consideration a stored actual access path cost includes:

taking into consideration the categorized actual access path cost, if it exists, for the workload group to which the request belongs.

20. The method of claim 14 where storing the measured actual costs includes:

storing the measured actual costs in a cache.

21. The method of claim 20 where storing the measured actual costs includes:

backing up the stored measured actual costs from the cache to a query capture data base.

22. The method of claim 14 further including:

where selecting an access path for the request includes taking into consideration a stored actual access path cost if the workload group is identified for such processing; and where selecting an access path for the request does not include taking into consideration a stored actual access path cost if the workload group is not identified for such processing.

23. The method of claim 22 where storing the one or more actual request element costs includes:

performing a workload analysis to associate each actual access path cost with the workload group to which the request is assigned.

24. The method of claim 23 where performing the workload analysis includes:

performing at least a portion of the workload analysis off-line.

25. The method of claim 23 where performing the workload analysis includes:

performing at least a portion of the workload analysis in real time.

26. A computer program, stored on a tangible storage medium, for use in optimizing processing of a request, the request including one or more predicates, each predicate referencing one or more relations, the program including executable instructions that cause a computer to:

identify the relations in the request;
identify one or more access paths for each relation;
identify the predicates in the request;
for each predicate,
  associate the predicate with the one or more access paths identified for the one or more relations referenced in the predicate;
  estimate costs of executing the predicate using the one or more access paths associated with the predicate; and
  for at least one access path for which a cost was estimated,
    determine that a stored actual access path cost for the access path exists, and, in response, substitute the stored actual access path cost for the estimated access path cost, the stored actual access path cost for the access path being a measured cost of executing the predicate using the access path;
execute the request using the selected access paths for the predicates,
measure an actual cost of executing the predicates in the request; and
store the measured actual costs as actual access path costs.

27. The computer program of claim 26 where when estimating the cost of executing the predicates using the one or more access paths the computer:

retrieves estimated costs stored in a data dictionary.

28. The computer program of claim 26 where when estimating the cost of executing the predicates using the one or more access paths the computer:

performs selectivity costing based on one or more of selectivity, cardinality and statistics.

29. The computer program of claim 26 where when selecting an access path the computer further:

for each predicate,
  selects the lowest cost access path from among the access paths associated with each predicate.

30. The computer program of claim 26 where requests are sorted into workload groups and the computer program further includes executable instructions that cause the computer to:

categorize the actual access path costs according to the workload group to which the request belongs.

31. The computer program of claim 30 where when selecting an access path for the request taking into consideration a stored actual access path cost the computer:

takes into consideration the categorized actual access path cost, if it exists, for the workload group to which the request belongs.

32. The computer program of claim 26 where when storing the measured actual costs the computer:

stores the measured actual costs in a cache.

33. The computer program of claim 32 where when storing the measured actual costs the computer:

backs up the stored measured actual costs from the cache to a query capture data base.

34. The computer program of claim 26 further including executable instructions that cause a computer to:

assign the request to an one of a plurality of workload groups;

where when selecting an access path for the request, the computer takes into consideration a stored actual access path cost if the one of the plurality of workload groups is identified for such processing; and where when selecting an access path for the request, the computer does not include take into consideration a stored actual access path cost if the one of the plurality of workload groups is not identified for such processing.

35. The computer program of claim 34 where when storing the one or more actual access path costs the computer:

performs a workload analysis to associate each actual access path cost with the workload group to which the request is assigned.

36. The computer program of claim 35 where when performing the workload analysis the computer:
   performs at least a portion of the workload analysis off-line.

37. The computer program of claim 35 where when performing the workload analysis the computer:
   performs at least a portion of the workload analysis in real time.

38. The computer program of claim 26 further including executable instructions that cause a computer to:
   create one or more workload groups; and
   assign the request to one of the one or more workload groups.

39. A database system including:
   a massively parallel processing system including:
      one or more nodes;
      a plurality of CPUs, each of the one or more nodes providing access to one or more CPUs;
      a plurality of data storage facilities each of the one or more CPUs providing access to one or more data storage facilities;
   a process for execution on the massively parallel processing system for optimizing processing of a request, the request including one or more predicates, each predicate referencing one or more relations, the process including:
      identifying the relations in the request;
      identifying one or more access paths for each relation;
      identifying the predicates in the request;
      for each predicate,
         associating the predicate with the one or more access paths identified for the one or more relations referenced in the predicate;
         estimating costs of executing the predicate using the one or more access paths associated with the predicate; and
      for at least one access path for which a cost was estimated,
         determining that a stored actual access path cost for the access path exists, and, in response, substituting the stored actual access path cost for the estimated access path cost, the stored actual access path cost for the access path being a measured cost of executing the predicate using the access path;
      executing the request using the selected access paths for the predicates,
      measuring an actual cost of executing the predicates in the request; and
      storing the measured actual costs as actual access path costs.

40. The database system of claim 39 where estimating the cost of executing the predicates using the one or more access paths includes:
   retrieving estimated costs stored in a data dictionary.

41. The database system of claim 39 where estimating the cost of executing the predicates using the one or more access paths includes:
   performing selectivity costing based on one or more of selectivity, cardinality and statistics.

42. The database system of claim 39 where selecting an access path further includes:
   for each predicate,
      selecting the lowest cost access path from among the access paths associated with each predicate.

43. The database system of claim 39 where requests are sorted into workload groups and the process further includes:
   categorizing the actual access path costs according to the workload group to which the request belongs.

44. The database system of claim 43 where selecting an access path for the request taking into consideration a stored actual access path cost includes:
   taking into consideration the categorized actual access path cost, if it exists, for the workload group to which the request belongs.

45. The database system of claim 39 where storing the one or more measured actual costs includes:
   storing the one or more measured actual costs in a cache.

46. The database system of claim 39 where storing the one or more measured actual costs includes:
   backing up the stored one or more measured actual costs from the cache to a query capture data base.

47. The database system of claim 39 where the process further includes:
   assigning the request to an one of a plurality of workload groups; and
   where selecting an access path for the request includes taking into consideration a stored actual access path cost if the one of the plurality of workload groups is identified for such processing; and
   where selecting an access path for the request does not include taking into consideration a stored actual access path cost if the one of the plurality of workload groups is not identified for such processing.

48. The database system of claim 47 where storing the one or more actual access path costs includes:
   performing a workload analysis to associate each actual access path costs with the workload group to which the request is assigned.

49. The database system of claim 48 where performing the workload analysis includes:
   performing at least a portion of the workload analysis off-line.

50. The database system of claim 48 where performing the workload analysis includes:
   performing at least a portion of the workload analysis in real time.

51. The database system of claim 39 where the process further includes:
   creating one or more workload groups; and
   assigning the request to one of the one or more workload groups.

52. The database system of claim 39 further comprising a plurality of additional process for optimizing processing of a request.

* * * * *